(12) United States Patent
Kindt et al.

(10) Patent No.: US 11,477,398 B2
(45) Date of Patent: Oct. 18, 2022

(54) IMAGE SENSOR AND IMAGING SYSTEM COMPRISING THE SAME

(71) Applicant: Teledyne DALSA B.V., Eindhoven (NL)

(72) Inventors: Willem J. Kindt, Berkel en Rodenrijs (NL); Alouisius W. M. Korthout, Drunen (NL)

(73) Assignee: TELEDYNE DALSA B.V., Eindhoven (NL)

( * ) Notice: Subject to any disclaimer, the term of this patent is extended or adjusted under 35 U.S.C. 154(b) by 0 days.

(21) Appl. No.: 16/923,146

(22) Filed: Jul. 8, 2020

(65) Prior Publication Data

US 2021/0014432 A1    Jan. 14, 2021

(30) Foreign Application Priority Data

Jul. 11, 2019   (EP) ..................................... 19185855

(51) Int. Cl.
*H04N 5/32*         (2006.01)

(52) U.S. Cl.
CPC ..................... *H04N 5/32* (2013.01)

(58) Field of Classification Search
CPC ...... H04N 5/32; H04N 5/37455; H04N 5/355; H04N 5/3743; H04N 5/378; H04N 5/374; H04N 5/379; H04N 5/3575; H04N 5/37457; H04N 5/3745; G01T 1/247; H01L 27/14609; H01L 27/14612; H01L 27/14663

See application file for complete search history.

(56) References Cited

U.S. PATENT DOCUMENTS 7,277,129 B1    10/2007  Lee
9,041,842 B2 *   5/2015  Willassen ............... H04N 5/378
                                                 348/308

(Continued)

FOREIGN PATENT DOCUMENTS

TW    201503698 A    1/2015
TW    201705749 A    2/2017
WO    2016153585 A1  9/2016

OTHER PUBLICATIONS

Extended European Search Report for EP Application No. 19185855.4 dated Jan. 24, 2020, 8 pages.

(Continued)

*Primary Examiner* — Ahmed A Berhan
(74) *Attorney, Agent, or Firm* — K&L Gates LLP

(57) ABSTRACT

The present invention relates to an image sensor and to an imaging system comprising the same. The present invention particularly relates to X-ray image sensors and imaging systems. The image sensor according to the invention comprises a pixel array that includes a plurality of active pixels arranged in a matrix of rows and columns, and a plurality of column lines to which outputs of pixels in the same column are coupled for the purpose of outputting pixel signals. The image sensor further comprises readout circuitry that includes a plurality of readout units, each readout unit being configured for reading out a respective column line through an input node of the readout unit. The image sensor is characterized in that the image sensor further comprises capacitive units, such as capacitors, for capacitively coupling each input node to its corresponding column line.

14 Claims, 8 Drawing Sheets

(56) References Cited

U.S. PATENT DOCUMENTS

| | | | |
|---|---|---|---|
| 2008/0185529 A1 | 8/2008 | Alving et al. | |
| 2012/0206608 A1 | 8/2012 | Endo et al. | |
| 2014/0022426 A1* | 1/2014 | Minami | H04N 5/3355 348/294 |
| 2015/0003584 A1* | 1/2015 | Weisfield | G01T 1/2018 250/366 |
| 2015/0015757 A1* | 1/2015 | Willassen | H04N 5/3559 348/308 |

OTHER PUBLICATIONS

Zadi et al., An a-Si Active Pixel Sensor (APS) Array for Medical X-ray Imaging, IEEE Transactions on Electron Devices, IEEE Service Center, Pisacataway, NJ, vol. 57, No. 11, Nov. 1, 2010, pp. 3020-3026.

Safavian et al., A Novel Hybrid Active-Passive Pixel with Correlated Double Sampling CMOS Readout Circuit for Medical X-ray Imaging, Circuits and Systems, ISCAS 2008, IEEE International Symposium, Piscataway, NJ, USA, May 18, 2008, pp. 3170-3173.

European Patent Office Communication for European Application No. 19185855.4 pursuant to Article 94(3) dated Aug. 13, 2021, 5 pages.

\* cited by examiner

IMAGE SENSOR AND IMAGING SYSTEM COMPRISING THE SAME

PRIORITY

This application is a Paris Convention Entry under 35 U.S.C. § 119(a) of European Patent Application No. EP19185855.4, entitled IMAGE SENSOR AND IMAGING SYSTEM COMPRISING THE SAME, filed Jul. 11, 2019, the contents of which is incorporated herein by reference in its entirety and for all purposes.

BACKGROUND

The present invention relates to an image sensor and to an imaging system comprising the same. The present invention particularly relates to X-ray image sensors and imaging systems.

Unless stated otherwise, an image sensor according to the present invention comprises an image sensor that is configured for capturing electromagnetic radiation. This radiation can in particular be in the form of visible light or it can be in the form of X-rays.

When the image sensor is configured for sensing X-rays, it may comprise a photosensitive element, such as a photodiode, that is configured for absorbing incoming X-ray photons and to generate a photocurrent. This type of conversion is referred to as direct conversion. Other image sensors may comprise a scintillator layer that converts incoming X-ray photons into visible light photons. These latter photons can be absorbed by the photosensitive element that in turn generates a photocurrent. This type of conversion is referred to as indirect conversion. The present invention relates to both types of conversion.

An image sensor typically comprises a pixel array. This array comprises a plurality of pixels arranged in a matrix of rows and columns. The image sensor generally further comprises a plurality of column lines to which outputs of pixels in the same column are coupled for the purpose of outputting pixel signals. The image sensor then further comprises readout circuitry. This circuitry comprises a plurality of readout units, each readout unit being configured for reading out a respective column line through an input node of the readout unit.

SUMMARY

An example of a known image sensor 1 is shown in FIG. 1. Here, only a single pixel 2 of the matrix is shown for illustrative purposes. Pixel 2 is a passive pixel comprising a photodiode PD that is coupled in between ground and the source terminal of a select FET Ts of which the gate is connected to a row select line rs. Instead of having the anode fixed at ground potential a different potential such as −5V could be used. The drain terminal of select FET Ts is connected to a column line cl. Some parasitic capacitance is associated with this line. In FIG. 1, this parasitic capacitance is represented by capacitor Cp. Typically, each row of the pixel matrix is connected to a respective row select line and each column is connected to a respective column line. For the purpose of driving the row select lines, image sensor 1 comprises a row controller (not shown) that ensures that two pixels in the same column are not inadvertently connected to the same column line at the same time.

Image sensor 1 further comprises readout circuitry. This circuitry comprises a plurality of readout units 3, typically one unit per column line. In FIG. 1, a single readout unit 3 is shown that comprises a charge amplifier 31, a correlated double sampling 'CDS' unit 32, and an analog-to-digital converter 'ADC' 33.

Charge amplifier 31 comprises a differential amplifier 34, such as an operational amplifier, having a non-inverting terminal '+' connected to a reference voltage Vref, and an inverting terminal '−' connected to the output of amplifier 34 via a feedback capacitor Cf. A switch s1 is arranged parallel to feedback capacitor Cf.

The output of amplifier 34 is connected to CDS unit 32 which performs two measurements and feeds the difference between these measurements to ADC 33 for converting the difference into a digital number.

In FIG. 1, the pixel array is arranged on a thin-film transistor 'TFT' panel. More in particular, the thin-film transistors on the TFT panel correspond to select transistors Ts. Photodiode PD is generally realized by arranging small islands of photosensitive material, such as amorphous silicon, on the TFT panel.

Furthermore, in FIG. 1, readout unit 3 is realized in an integrated circuit arranged on a semiconductor die. The division between integration on a semiconductor die and integration on the TFT panel is indicated by dotted line 4.

During pixel readout, pixel 2 is connected through select FET Ts to column line cl. Column line cl, including its parasitic capacitance Cp, is initially reset to Vref by switch s1 of charge amplifier 31. When pixel 2 is selected via select FET Ts, the internal capacitance of photodiode PD, hereinafter referred to as Cdiode, is also charged to Vref. If the internal capacitance had previously been discharged by a photocurrent then the potential across the internal capacitance would start at Vref−Vsig. This implies that there is a signal charge Qsig=Cdiode×Vsig on Cdiode. To reset photodiode PD to Vref, this signal charge has to move across the column line to feedback capacitance Cf of charge amplifier 31. This in turn implies that the voltage at the output of charge amplifier 31 rises with an amount dV=Qsig/Cf. This voltage step at the output of charge amplifier 31, i.e. from Vref to Vref+Qsig/Cf, is sampled by CDS unit 32. The sampled output signal of CDS unit 32 is subsequently converted to a digital number by ADC 33. CDS unit 32 cancels the reset noise and charge injection that occurs in charge amplifier 31.

Column line cl has a large parasitic capacitance Cp. This creates a noise problem. Charge amplifier 31 is keeping the potential on Cp constant at Vref, which corresponds to the voltage at its non-inverting terminal '+'. However, in reality, charge amplifier 31 keeps the voltage on Cp equal to Vref plus its own noise voltage. The latter can be represented by a voltage source in series with non-inverting terminal '+' of amplifier 34. More in particular, amplifier 34 forces a current through feedback capacitor Cf into Cp, in order to charge Cp to the noise of amplifier 34. This current charges not only Cp, but also Cf. There is a noise gain of approximately Cp/Cf. Since typically Cf<<Cp, for example Cp=30 pF and Cf=300 fF, the noise gain can be very high. Because of this high noise gain, the noise of amplifier 34 should be as low as possible.

Low noise can be achieved by biasing the input stage of amplifier 34 using a high current. This considerably increases the power dissipation thereby causing self-heating in the image sensor. This may become a problem as at high temperatures, scintillator layers, as used in indirect conversion x-ray image sensors, may degrade and a leakage current of photodiode PD may increase resulting in more dark noise.

Another manner to get low noise is to reduce the bandwidth of CDS unit 32 for sampling the signals. Typically, a low-pass filter is inserted between charge amplifier 31 and CDS unit 32. The lower the bandwidth of this low pass filter, the lower the noise. Clearly, there is a tradeoff between power dissipation (self heating), speed (bandwidth) and noise. This trade-off is a fundamental limitation of passive pixel TFT panels.

The noise/speed/power tradeoff discussed before can be avoided with an active pixel. FIG. 2, in which the same reference signs are used to refer to the same or similar components as in FIG. 1, illustrates a known image sensor 1 in which active pixels 2 are used.

Active pixel 2 is a known three transistor (3T) pixel comprising a reset FET Tr, a select FET Ts, and a source follower SF. It is referred to as an active pixel because source follower SF provides a buffering function within pixel 2 itself.

In active pixel 2, photodiode PD will charge the storage capacitor that is either a capacitance internal to photodiode PD or an external capacitor. This charging is reflected in the voltage at node N. This latter node can be reset to a reference voltage, vdd, using reset FET Tr that is controlled by a row controller (not shown) using reset line it. When detecting light, the resulting photocurrent will gradually discharge the storage capacitor resulting in a decrease in the voltage at node N.

The voltage at node N can be read out using select transistor Ts that is controlled by a row controller (not shown) using row select line rs. When activated, the voltage at node N will be put onto column line cl via source follower SF. This latter transistor is biased using current source 35 that is internal to readout unit 3.

Active pixels 2 are generally realized using CMOS technology. However, compared to TFT panels, a size of CMOS based pixel arrays is more difficult and costly to increase. Efforts have therefore been undertaken to realize active pixel arrays on TFT panels. The Applicant has however found that realizing active pixel arrays on TFT panels is not without problems. More in particular, transistors made in a glass TFT panel fabrication process have a large threshold variation. The threshold voltages of the TFTs vary because of process variation, temperature variation, negative or positive bias temperature instability, and exposure to x-rays. All of these effects are much larger in TFTs than in CMOS.

Using a standard integrated circuit fabrication process for realizing the readout circuitry will impose a limit for the supply voltages to be used, e.g. 3.3V or 5V. The voltage on input node M of readout unit 3 should be within the supply rails. Variation in the threshold voltage of the TFTs reduces the available room for signal swing. In addition, some headroom is required for current source 35 that biases source follower SF.

If the threshold variation is 3V and if a 3.3V supply should be used for readout unit 3, an essentially zero dynamic range would remain for the signal. One option would be to use a more costly high-voltage CMOS process for realizing readout unit 3 in combination with a higher supply voltage for the TFT panel. However, such solution would at least partially reduce the benefits associated with TFT panels.

It is an object of the present invention to provide an image sensor comprising a plurality of active pixels in which the abovementioned problem does not occur or at least to a lesser extent.

According to the invention, this object is achieved with an image sensor as described in claim 1 that is characterized in that the image sensor further comprises capacitive units, such as capacitors, for capacitively coupling each input node to its corresponding column line.

By using a capacitive coupling between the input node and the column line it becomes possible to shift the voltages at the input node to values within the operational range of the readout circuitry. More in particular, it can be prevented that the reference voltage used for operating the pixels and column lines is put on the input node of the readout circuitry. This enables the image sensor of the present invention to be implemented using TFT technology.

The image sensor may further comprise a row controller for selecting pixels among the plurality of pixels for readout, wherein the image sensor is configured to perform, for each selected pixel, a correlated double sampling measurement 'CDS' scheme based on first and second pixel readouts. For example, the first pixel readout may correspond to a pixel being read out a predetermined amount of time after the pixel was reset, and the second pixel readout may correspond to a pixel being read out directly after having been reset. Typically, the predetermined amount of time, also referred to as the integration time, is sufficient to fully use the available voltage swing of the pixel voltage when the pixel array is irradiated with a corresponding maximum dose. Typically the pixel array is read out and reset, row by row. After the entire pixel array has been read out and reset, the X-ray source or other source of electromagnetic radiation creates an exposure flash and the pixels integrate light. After a predetermined amount of time, the pixels are read out and reset row by row. In this first pixel readout, the sample that is taken is referred to as the signal level. Immediately afterwards, the pixel is reset and a second sample is obtained. This second sample is referred to as the reference level for the CDS scheme.

The pixel array and/or the capacitive unit may be integrated on a thin-film transistor 'TFT' panel. For example, the TFT panel can be based on amorphous silicon, low-temperature polycrystalline silicon, or indium gallium zinc oxide. These materials are deposited on a substrate for example a glass panel. The photosensitive elements may equally be formed depositing a photosensitive material, such as amorphous silicon or amorphous selenium, onto the substrate.

The readout circuitry and/or the row controller are at least partially integrated on one or more semiconductor dies. For example, the readout circuitry and/or the row controller may be based on complementary metal-oxide-semiconductor 'CMOS' technology. In some embodiments, the readout circuitry is based on CMOS technology, but the row controller is integrated in the TFT panel. For example, the row controller could be integrated on a low-temperature polycrystalline silicon technology similar to the pixel array and capacitive unit.

By arranging the pixel array and the capacitive unit, for example in the form of a capacitor, on the TFT panel and by using one or semiconductor dies on which the readout circuitry is at least partially integrated, a voltage isolation can be achieved between the relatively low voltages that may occur on the one or more semiconductor dies and the relatively high voltages that may occur on the TFT panel. In this manner, the capacitive unit prevents damaging the one or more semiconductor dies or circuitry arranged thereon.

The readout circuitry may be composed of a plurality of first segments, each first segment corresponding to a plurality of column lines and being integrated on a respective first semiconductor die. The first segments may be identical to each other. The image sensor may further comprise a plurality of first flex foils by which the TFT panel is connected to an external device, wherein the respective first semiconductor dies are arranged on respective first flex foils. The external device may for example be a device that collects the various readouts for the pixel array and constructs an image based on the readouts.

The image sensor may further comprise, for each pixel, a source follower for buffering the pixel signal and a select transistor for outputting the buffered pixel signal onto the corresponding column line in dependence of a row select signal outputted by the row controller. Additionally, the image sensor may comprise, for each column line, a source follower load, such as a current source or resistor, integrated on the TFT panel. Compared to known sensors, the source follower load is no longer part of the integrated circuit in which the readout circuitry is arranged but is integrated on the TFT panel. Accordingly, any high voltages that may occur during operation are kept isolated from the input nodes of the readout units by the capacitive coupling between input node and column line.

Furthermore, the image sensor may further comprise, for each pixel, a photodiode arranged in between a signal node and a node that is kept at a first reference voltage such as ground. Each pixel may further comprise a storage capacitor configured for accumulating charge due to a photocurrent generated by the photodiode, and a reset transistor coupled in between the photodiode and a second reference voltage and being configured to set a voltage on the signal node to the second reference voltage in dependence of a reset signal outputted by the row controller. In some embodiments, the storage capacitor is solely formed by the internal capacitance of the photodiode whereas in other embodiments an additional capacitor is arranged parallel to the photodiode. Such additional capacitor could be advantageous if the internal capacitance of the photodiode is too small to achieve the desired full well capacity.

The row controller may comprise a plurality of second segments, wherein each second segment corresponds to a plurality of rows of the pixel array. These second segments may be identical. Each second segment may further comprise a driver for outputting, for the plurality of rows, the row select signals and the select signals when applicable, and it may be integrated on a respective second semiconductor die. The image sensor may further comprise a plurality of second flex foils by which the TFT panel is connected to a remainder of the row controller, wherein the respective second semiconductor dies are arranged on respective second flex foils.

The readout circuitry may comprise a plurality of analog-to-digital converters 'ADCs'. For example, a single ADC may be provided for each column line. Alternatively, column parallel CDS circuits may be used that are followed by a multiplexer. This multiplexer directs the inputs received from the CDS circuits associated with a plurality of column lines into one or more high speed ADCs. In this case, one ADC may be used for converting signals for more than one column line.

The readout circuitry may be configured to read out the column lines based on a charge mode readout. For example, each readout unit may be configured to set a voltage on the input node equal to a third reference voltage during the first pixel readout and second pixel readout. Each readout unit may be configured to determine an output voltage based on a charge transfer during the second pixel readout to or from the capacitive unit. More in particular, each readout unit may comprise a charge amplifier comprising an operational amplifier, having a non-inverting input connected to the third reference voltage, and an inverting input connected to the capacitive unit via a first switch. An output of the operational amplifier may be coupled to the inverting input via a feedback capacitor. Each readout unit may further comprise a second switch arranged between the output and the inverting input of the operation amplifier. In addition, the image sensor may comprise a second controller which is configured for controlling the first and second switches such that the voltage at the input node is set to the third reference voltage by closing the first and second switches during the first pixel readout, and such that the second switch is open when performing the second pixel readout. The second controller may be further configured to control the first switch to be open when an output of the operational amplifier is converted by the ADC.

Alternatively, the readout circuitry may be configured to read out the column lines based on a voltage mode readout. For example, the input node of each readout unit can be a high impedance input node and each readout unit may be configured to set a voltage on the input node equal to a fourth reference voltage during the first readout and to determine an output voltage based on an change in voltage of the input node with respect to the fourth reference voltage during the second pixel readout. More in particular, each readout unit may further comprise a voltage setting unit for setting a voltage on the input node to the fourth reference voltage during the first pixel readout, and for providing a high impedance state in the second mode to allow the voltage on the input node to track the pixel voltage when changing from a value corresponding to the first pixel readout to a value corresponding to the second pixel readout.

An exemplary embodiment of a readout unit based on voltage mode readout comprises a first operational amplifier having a non-inverting input connected via a third switch to the fourth reference voltage and an inverting input connected to an output of the operational amplifier. It may further include a charge amplifier that comprises a second operational amplifier having a non-inverting input connected to a fifth reference voltage and an inverting input that is connected via a series capacitor and series fourth switch to the output of the first operational amplifier, and connected via a parallel connection of a feedback capacitor and fifth switch to an output of the second operational amplifier. The readout circuitry may further comprise a third controller configured to control the third switch to be closed during the first pixel readout and to be open during the second pixel readout, to control the fourth switch to be closed during the first and second pixel readouts and to be open after the second pixel readout to allow an output of the second operational amplifier to be converted by the ADC, and to control the fifth switch to be open during the first pixel readout and to be closed during the second pixel readout.

In an embodiment, the timing signals of the readout circuitry are synchronized to the timing of the row controller by a main controller that is generally arranged outside of the readout circuitry and TFT panel. This main controller may correspond to the second or third controller described above. Typically, the main controller is a field programmable field array 'FPGA' or a microcontroller and may be arranged off the panel and outside of the readout circuitry. The row controller can be embodied as a gate driver containing a shift register to select a row and a few gates to control the reset and row select lines. The timing of the reset and row select lines for the row that is pointed to by the shift register can be controlled with a few digital signals provided to the gate driver by the FPGA or microcontroller. The FPGA or microcontroller may also provide clock and data input signals for the shift register. The FPGA may also provide timing synchronization signals to the readout circuitry to ensure that the readout circuitry and the gate driver operate synchronously.

The image sensor may further comprise a scintillator layer arranged above the pixel array. Such layer may be used for indirect conversion image sensors.

According to a second aspect, the present invention provides an imaging system comprising the image sensor as described above and a processing unit for constructing an image based on outputs from the readout circuitry. The imaging system can be configured for constructing X-ray images of an object. In this case, the imaging system may further comprise an X-ray source positioned such that the object to be imaged can be arranged in between the X-ray source and image sensor.

BRIEF DESCRIPTION OF THE FIGURES

Next, the invention will be described in more detail, wherein.

DETAILED DESCRIPTION

Figure 1:
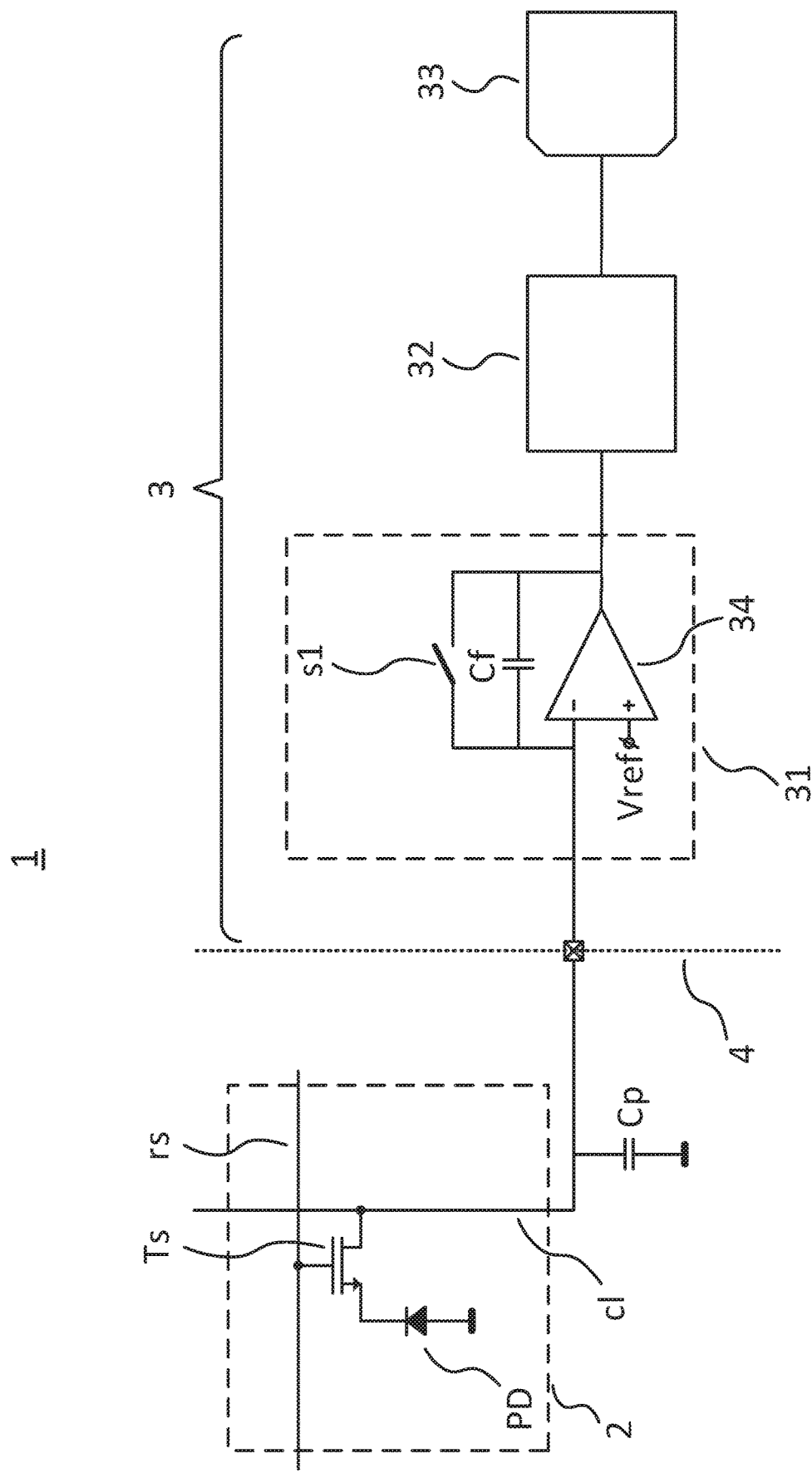
FIG. 1 illustrates an example of a known TFT based image sensor using passive pixels.
Figure 2:
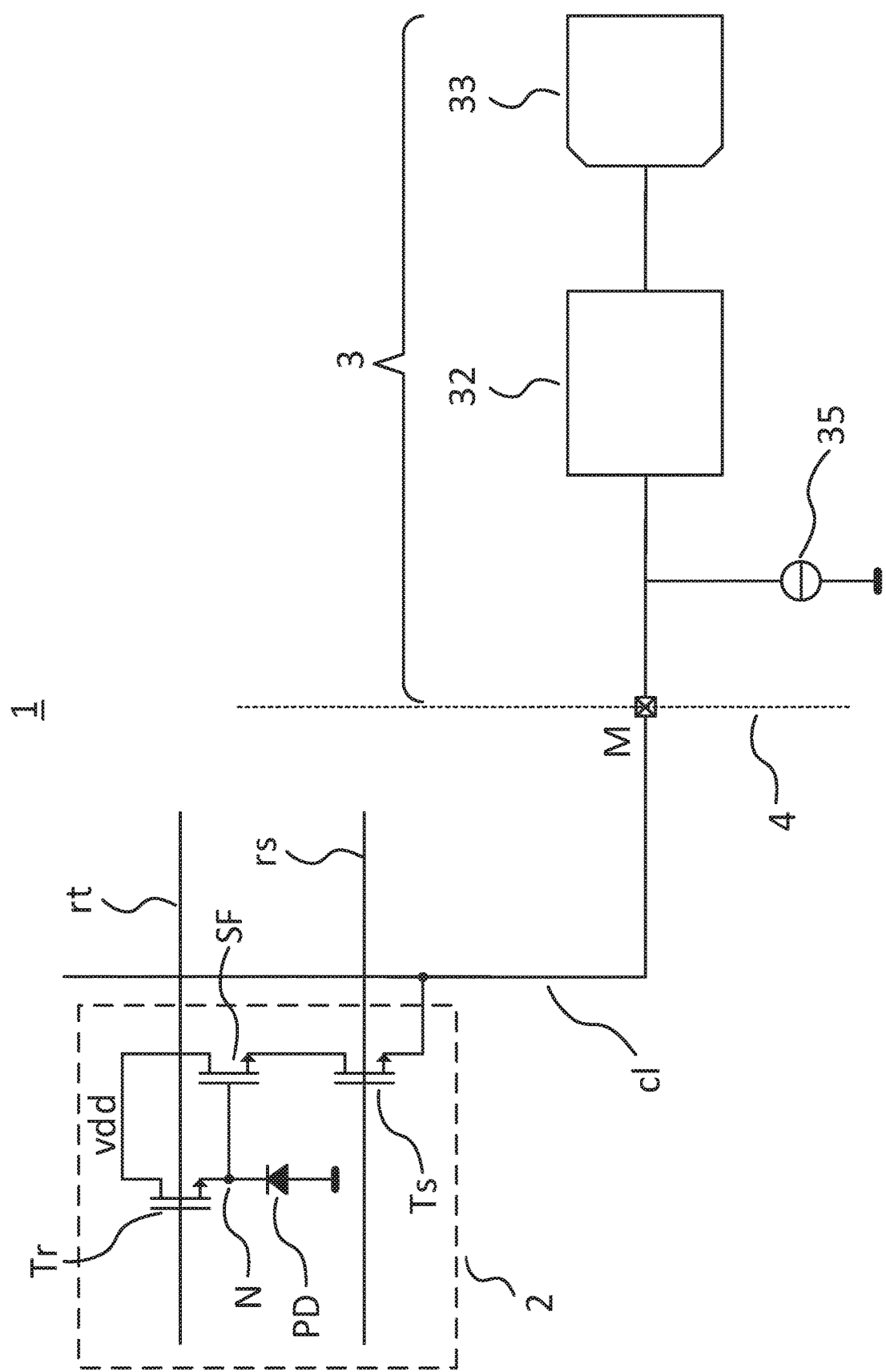
FIG. 2 illustrates an example of a known TFT based image sensor using active pixels.
Figure 3:
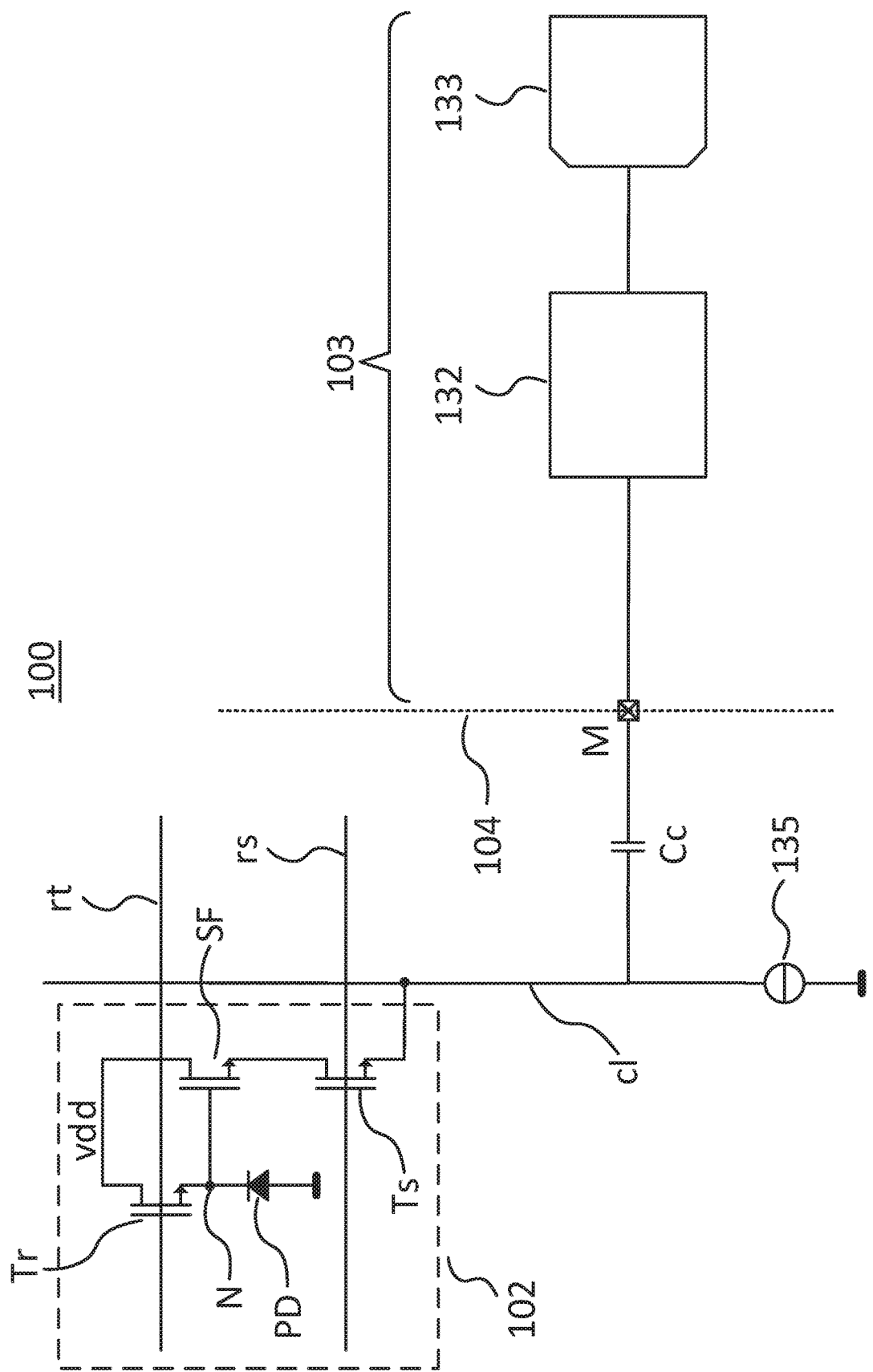
FIG. 3 schematically illustrates the concept of the present invention applied to a TFT panel.

FIG. 3 schematically illustrates the concept of the present invention applied to a TFT panel. More in particular, an embodiment of an image sensor 100 in accordance with the present invention comprises, similar to the image sensor of FIG. 2, a pixel array of which a single active pixel 102 is shown in FIG. 3. Active pixel 102 comprises a reset transistor Tr controlled via a reset line rt, a select transistor Ts controlled via a row select line rs, and source follower SF.

Readout unit 103 having an input node M comprises a correlated double sampling unit 132 and an ADC converter 133.

As indicated by dotted line 104, which indicates a boundary between the TFT panel and integrated circuitry arranged on a semiconductor die, current source 135, acting as a load for source follower SF, is arranged on the TFT panel whereas readout unit 103 is integrated on a semiconductor die. The capacitive coupling between input node M and column line cl is provided by capacitor Cc, which is equally formed on the TFT panel, and which provides a voltage level shift between input node M and column line cl. Capacitor Cc can be implemented on the TFT panel as a simple parallel plate capacitor.

Any threshold voltage variation of the TFT is stored on capacitor Cc such that readout unit 103 does not have to sacrifice voltage headroom for TFT threshold variation.

Current source 135 can be embodied as a current mirror, where there is one transistor for each column in the panel. Current source 135 can also be embodied as a cascoded current source. The input of the mirror could also be a (pair of) transistors on the TFT panel. The bias current for the mirror could be generated inside readout unit 103 or inside readout circuitry in case a single bias current is to be generated for multiple column lines cl.

Figure 4:
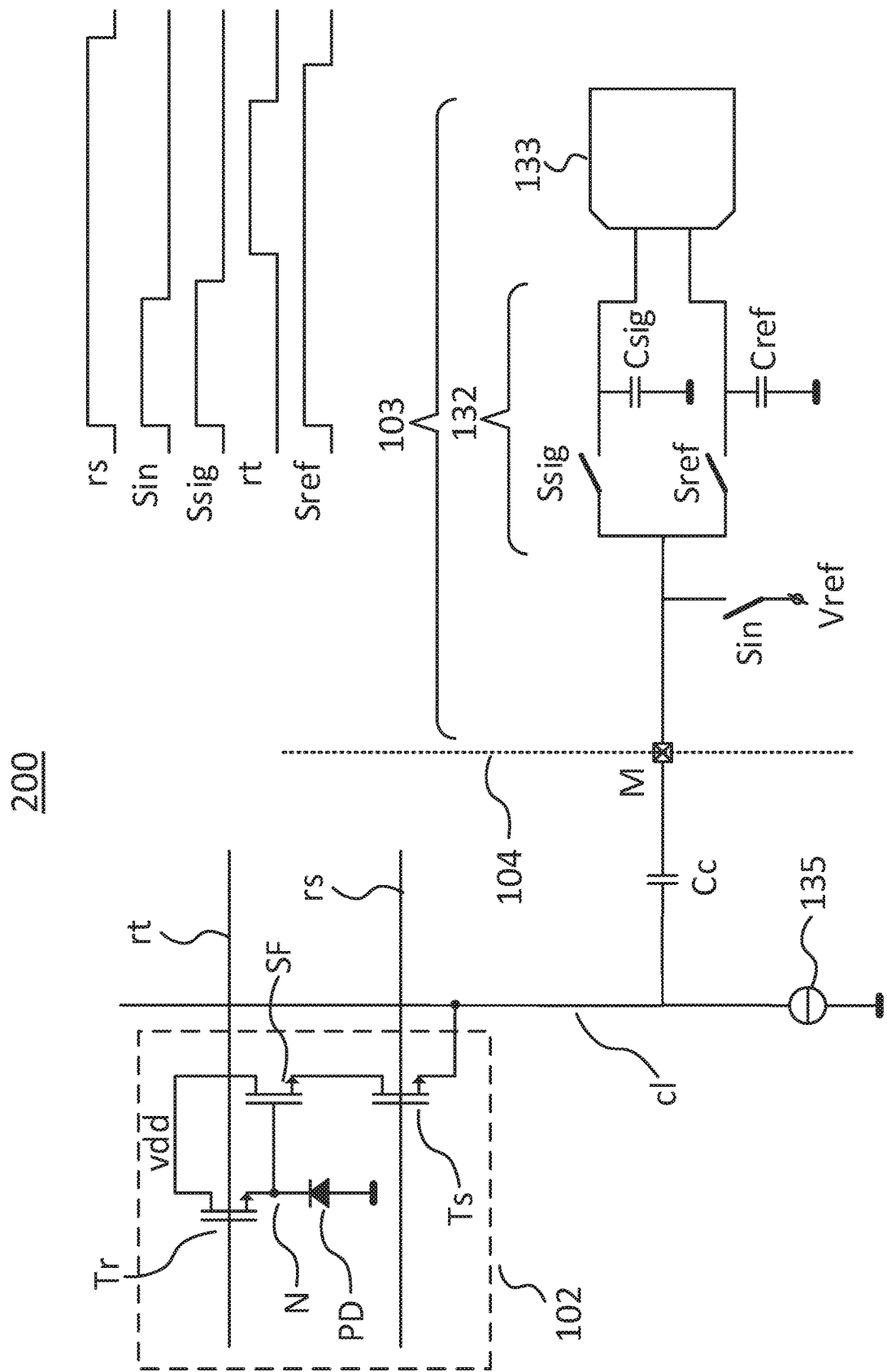
FIG. 4 illustrates an embodiment of an image sensor according to the invention using voltage mode readout.

FIG. 4 illustrates an embodiment of an image sensor 200 according to the invention using voltage mode readout. FIG. 4 shows a relatively simple implementation of CDS unit 132.

As long as a pixel row is selected, the voltage on column line cl will always settle to a defined DC voltage. This settling may take some time but after settling, the DC voltage is substantially defined as the voltage on node N minus the threshold Vth of the source follower.

The operation of image sensor 200 will be explained referring to the timing diagram shown in the upper right corner of FIG. 4. Initially, the voltage on node N is vdd−vsig, where vdd is the original potential after reset and vsig is the amount that the potential has dropped due to exposure to light. The voltage on the left plate of Cc is vdd−vsig−Vth, where Vth is the threshold of source follower SF. The voltage on the right plate of capacitor Cc is pulled via switch Sin to Vref. The voltage on capacitor Cc, Vcap, is thereby made equal to Vcap=vdd−vsig−Vth−Vref.

After some time, when Vcap has settled, switch Sin opens as indicated by the negative edge of Sin in the timing diagram. From this point onwards, the voltage on the right plate of Cc tracks any shifts on the left plate. More in particular, due to the high input impedance associated with input node M, there is substantially no current flowing into input node M from the side of capacitor Cc. With no current flowing through Cc, the voltage across Cc is constant. This implies that the voltage on the right plate just tracks the voltage on the left plate with a level shift equal to Vcap calculated above.

Shortly after opening Sin, Ssig opens and the signal level on Csig is sampled by CDS unit 132. The voltage on Csig is to a first order equal to Vref. To a second order, it is equal to Vref plus any charge injection that occurs when opening Sin and also the charge injection that occurs when opening Ssig.

After sampling the signal level on Csig by CDS unit 132, pixel 102 is reset. The voltage on node N then changes from vdd−vsig to vdd. The voltage on column line cl changes from vdd−vsig−Vth to vdd−Vth. This implies that the column voltage steps up with an amount Vsig. As a result, the voltage on Cref moves up from Vref to Vref+Vsig. After opening Sref, the signal level on Cref is sampled by CDS unit 132. By subtracting the second pixel readout from the first pixel readout, i.e. Vref−(Vref+Vsig)=Vsig, the component in the pixel signal associated with the amount of captured light can be extracted. This value can subsequently be converted into a digital number by ADC unit 133.

There is capacitive attenuation of the signal voltage due to capacitive division between Cc and Cref. However, because Cc>>Cref this attenuation can be neglected. Alternatively, a voltage buffer may be arranged in between input node M and switches Ssig and Sref to avoid the capacitive loading caused by Csig and/or Cref.

Figure 5:
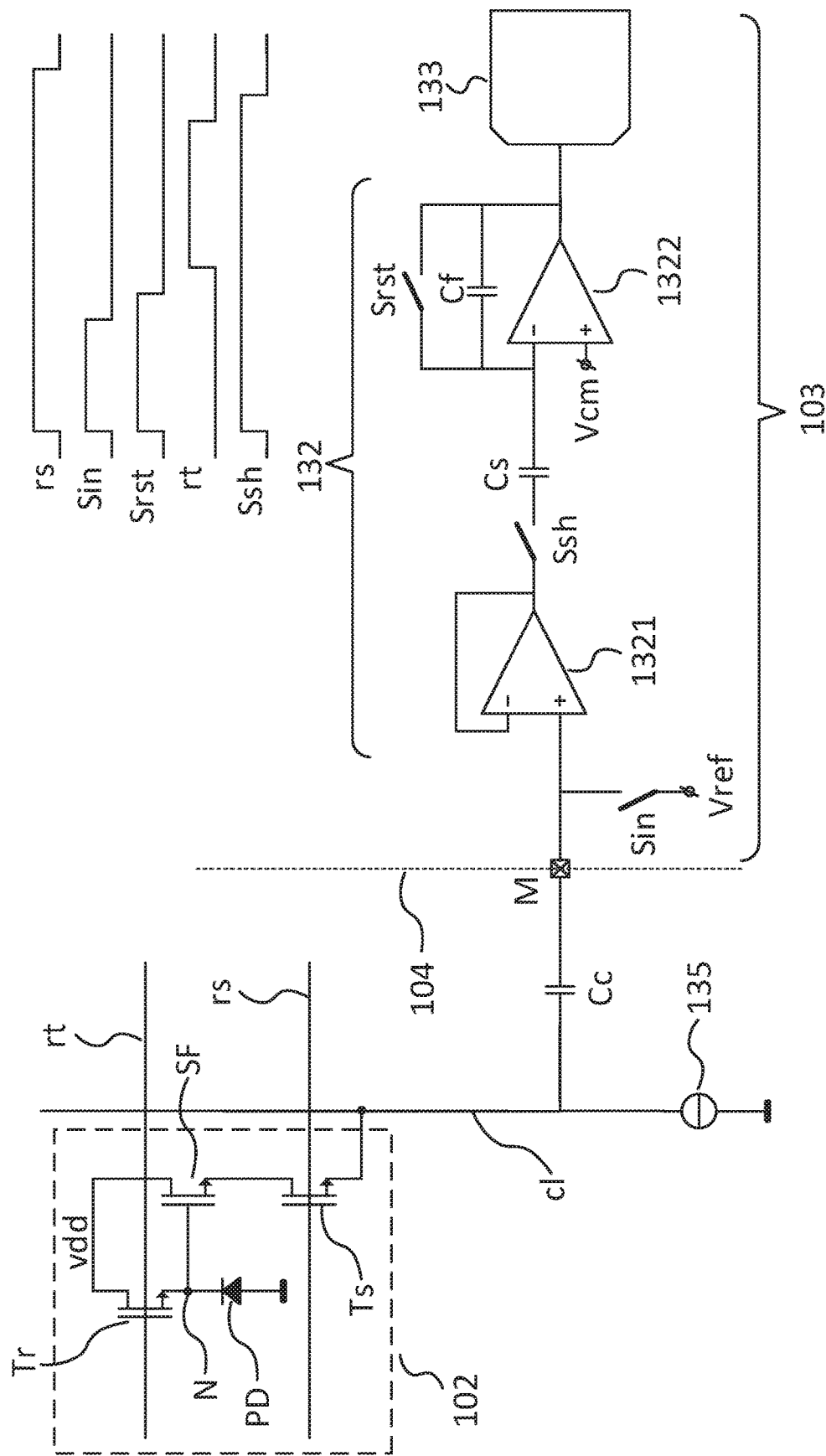
FIG. 5 illustrates a further embodiment of an image sensor according to the invention using voltage mode readout.

FIG. 5 illustrates a further embodiment of an image sensor 300 according to the invention using voltage mode readout.

The operation of Cc and Sin is exactly the same as in FIG. 4. Moreover, the same reference signs will be used to refer to the same or similar components.

CDS unit 132 comprises a first operational amplifier 1321, which acts as a voltage buffer that ensures that readout unit 103 has a high input impedance allowing the voltage step that occurs on the right hand plate of Cc when pixel 102 is being reset to be accurately tracked. The capacitive voltage division may be smaller with this implementation because only the input capacitance of the buffer loads column line cl.

CDS unit 132 further comprises a second operational amplifier 1322, which acts as a charge amplifier. The non-inverting input of amplifier 1322 is connected to a reference voltage Vcm and the inverting input is connected to the output of amplifier 1321 via a series connection of switch Ssh and capacitor Cs. The inverting input is further connected to the output of amplifier 1322 via feedback capacitor Cf. A switch Srst is arranged parallel to capacitor Cf and the output of amplifier 1322 is connected to ADC unit 133.

In this embodiment, readout unit 103 has a high input impedance allowing the voltage step that occurs on the right hand plate of Cc when pixel 102 is being reset to be accurately tracked.

Initially, when column line cl is at vdd−vsig−Vth, Sin forces the right plate of capacitor Cc to Vref. At this time, because Srst of CDS unit 132 is closed, a voltage over capacitor Cs will be equal to Vref−Vcm. Subsequently, Sin opens and a voltage is sampled on Cc. After that, Srst opens. This ends the reset of capacitor Cf. Now, if pixel 102 is reset using reset line rt, there will be a voltage step with an amount Vsig on input node M, which is also reflected at the right plate of Cc and the left plate of Cs. Because the right plate of Cs is fixed at Vcm, this causes a current through Cs that also flows through Cf. As a result, the output of CDS unit 132 changes from Vcm, the level during the reset, to Vcm+Vsig×Cs/Cf. This demonstrates that CDS unit 132 acquires the pixel signal voltage with a gain that depends on the capacitance ratio and that it level shifts the signal voltage to a new reference level Vcm. Vcm can be chosen at any convenient voltage level for CDS unit 132 and ADC unit 133 to prevent electrical breakdown of components in these units. For example, Vcm can be set to a voltage level above 0V that can be easily reached by amplifier 1322 to avoid the need for a negative supply voltage for amplifier 1322.

When switch Ssh opens, there can no longer be any current flow through Cs and therefore also no current flow through Cf. This freezes/samples/stores the signal voltage on the output of CDS unit 132 for subsequent ADC conversion by ADC unit 133.

Figure 6:
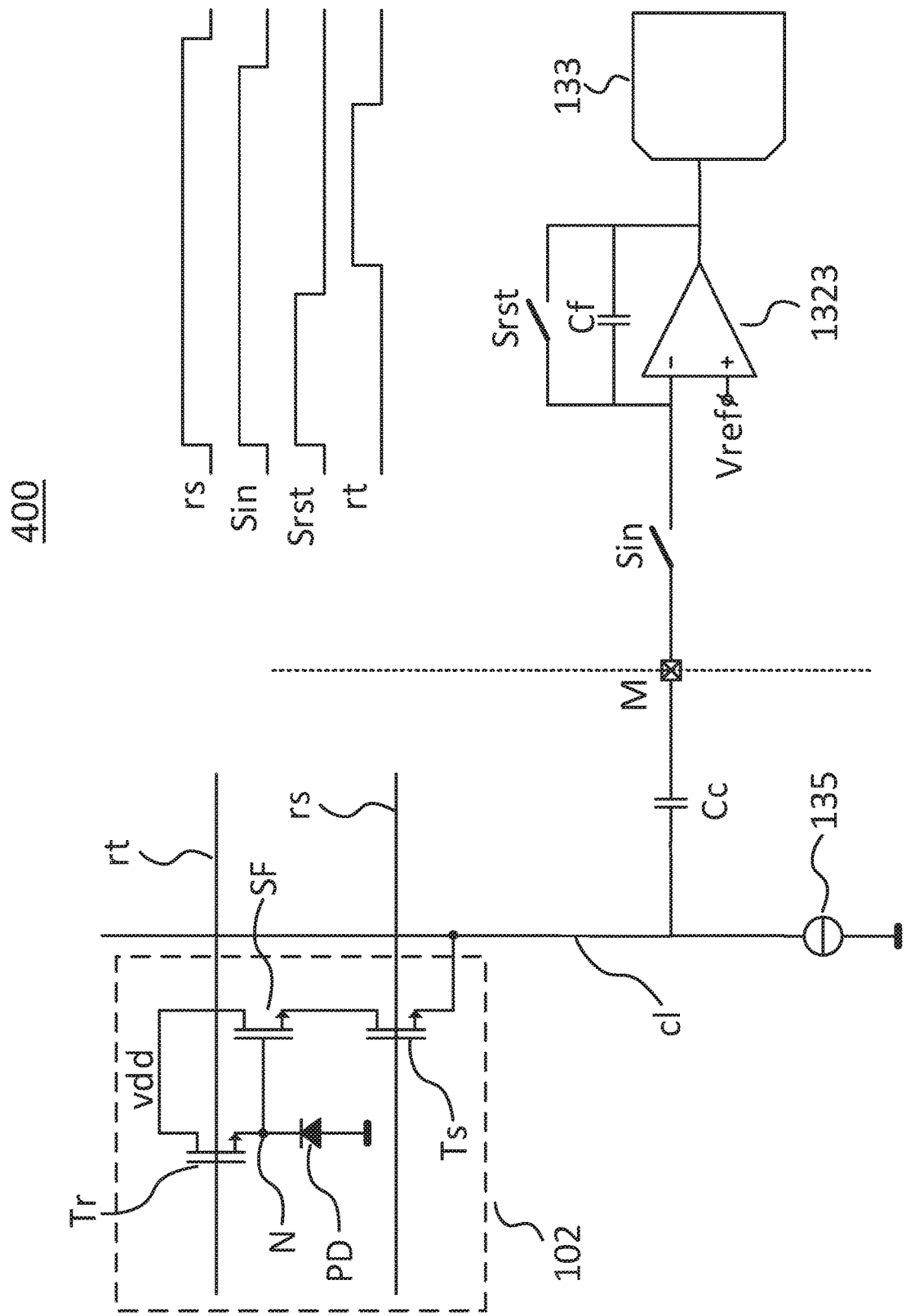
FIG. 6 illustrates an embodiment of an image sensor according to the invention using charge mode readout.

FIG. 6 illustrates an embodiment of an image sensor according to the invention using charge mode readout. In this case, readout unit 103 comprises a charge amplifier formed using an operational amplifier 1323, but together with switches Srst and Sin and the timing signals, the charge amplifier actually implements a CDS operation. This CDS operation is quite similar to the operation of CDS unit 132 described in conjunction with FIGS. 4 and 5.

Initially, the left plate of Cc is at vdd−vsig−Vth. Initially Sin and Srst are ON which allows operational amplifier 1323 to force a voltage equal to Vref on the right plate of Cc, which voltage may for example correspond to a voltage between the supply rails of amplifier 1323. Subsequently, Srst opens. After that, operational amplifier 1323 can only affect the voltage on input node M by forcing a current into feedback capacitor Cf. Subsequently pixel 102 is reset. This shifts the column line voltage from vdd−vsig−Vth to vdd−vsig. The inverting input of operational amplifier 1323 remains constant at Vref. Therefore the voltage across Cc changes with an amount Vsig. This change in voltage implies a change in charge equal to Cc×Vsig. Therefore a charge should flow through Cf into Cc. This charge causes the potential at the output of operational amplifier 1323 to increase from Vref to Vref+Vsig×(Cc/Cf). Eventually, Sin can be opened to isolate operational amplifier 1323 from column line cl. From this point onward, there can be no current flowing into input node M thereby freezing the output voltage of operational amplifier 1323. This output voltage can be processed by ADC unit 133.

The ADC unit 133 depicted in FIGS. 4-6 could be a column parallel ADC or an ADC that is shared between multiple columns of the pixel array.

In the embodiments shown in FIGS. 5 and 6, the value of Cc is affecting the gain of CDS unit 133. The value of Cc can vary from column to column. This causes a column gain pattern. The value of Cc is constant over temperature/lifetime making it convenient to remove the gain pattern by a calibration such as a flat-field correction.

Figure 7:
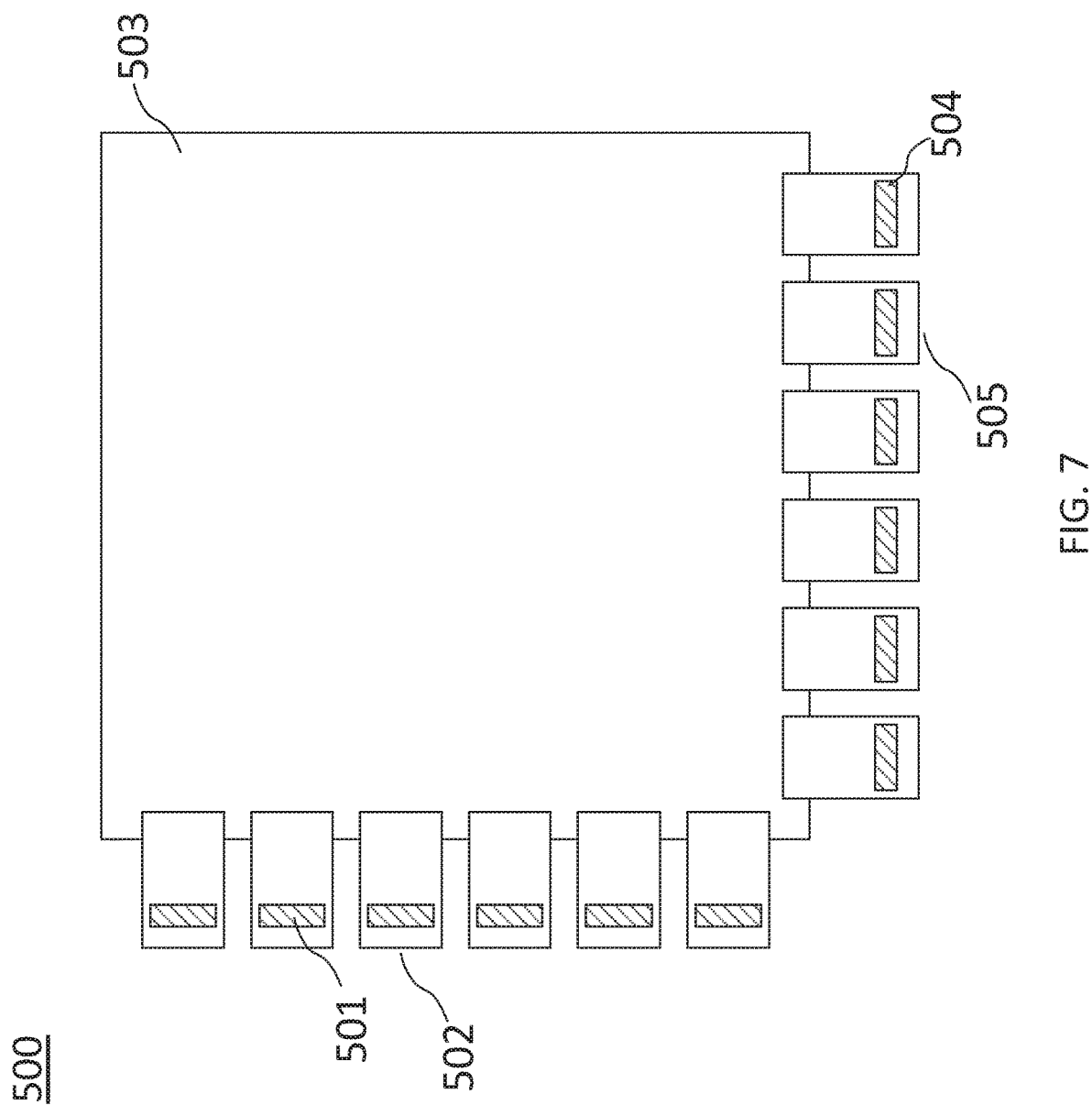
FIG. 7 illustrates a layout of an embodiment of an image sensor in accordance with the present invention.

FIG. 7 illustrates a layout of an embodiment of an image sensor 500 in accordance with the present invention. On the right side, row driver integrated circuits 501 are arranged on flex-foils 502 that are bonded to panel 503 on which the pixel array is arranged. Circuits 501 control the row select lines and reset lines. More in particular, each integrated circuit 501 drives the row select lines and reset lines for a plurality of rows of pixels. These circuits are part of the row controller. In an embodiment, row controller is substantially completely formed by circuits 501. In other embodiments, the row controller may comprise additional circuitry that is arranged remote from panel 503 and flex foils 502. For example, panel 503 can be mounted to a separate printed circuit board (not shown) wherein electrical connection between circuitry on the printed circuit board and panel 503 is obtained via flex foils 502. In such case, the abovementioned additional circuitry can be realized on the printed circuit board. It is also possible to split the column lines in the center of the array. If the column lines are each split into a top and bottom half, then there should be readout circuitry on both sides of the pixel array to read out the top half of the pixel array connected to the top half of the column line and the bottom half of the pixel array connected to the bottom half of the column line. This method doubles the amount of circuitry, but also increases the overall speed of the detector by a factor two.

Regardless of a column line split, it is also possible to drive the row select lines either from a single side or from both sides of the pixel array. Driving on two sides provides a speed advantage since effectively only half of the RC-load of the row select lines is loading the gate drives on either side of the pixel array.

The readout circuitry can also be divided into separate integrated circuits 504 that are mounted on flex foils 505. Also in this case, the readout circuitry can be completely formed by integrated circuits or part of the readout circuitry can be arranged on the printed circuit board. Furthermore, each integrated circuit 504 comprises readout units for multiple column lines.

Figure 8:
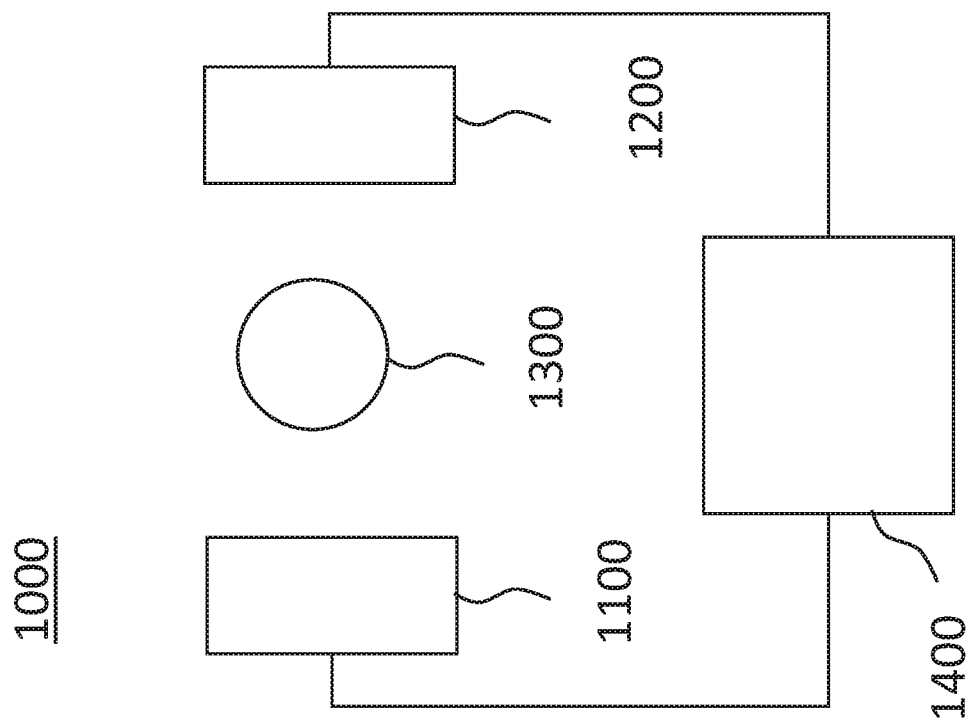
FIG. 8 illustrates an X-ray imaging system in accordance with the present invention.

FIG. 8 illustrates an X-ray imaging system 1000 in accordance with the present invention. It comprises an X-ray source 1100 and an image sensor 1200 in between which an object 1300 to be imaged can be provided. A general controlling and processing unit 1400 may be provided for controlling X-ray source 1100 and image sensor 1200 and for constructing an X-ray image based on the output from image sensor 1200. Any of the image sensors presented in FIGS. 4-6 may be used as image sensor 1200.

In the above, the present invention has been explained using detailed embodiments thereof. However, the present invention is not limited to these embodiments. Various modifications can be made to these embodiments without departing from the scope of the invention which is defined by the appended claims and their equivalents.

For example, some direct conversion detectors integrate holes, rather than electrons. In such detectors, the voltage at 'node N' is increasing due to integration, rather than decreasing. In such pixels, typically the 'vdd' that is used to reset 'node N' is a different potential than the 'vdd' that is connected to the drain of the source follower 'SF'. This changes the direction of the voltage step that is sensed by the correlated double sampling circuit in the readout circuitry. The skilled person will readily understand that the present invention equally relates to such embodiments.

The invention claimed is:

1. An image sensor, comprising:
a pixel array comprising a plurality of active pixels arranged in a matrix of rows and columns, and comprising a plurality of column lines to which outputs of pixels in the same column are coupled for the purpose of outputting pixel signals;
readout circuitry comprising a plurality of readout units, wherein each readout unit comprises an input node and is configured to read out a respective column line through the input node;
a row controller for selecting pixels among the plurality of active pixels for read-out; and
a plurality of capacitive units wherein each capacitive unit is configured to capacitively couple each input node to the respective column line,
wherein the pixel array and the plurality of the capacitive units are integrated on a thin-film transistor ('TFT') panel, and
wherein the readout circuitry and the row controller are integrated on one or more CMOS semiconductor dies.

2. The image sensor of claim 1, wherein for each selected pixel, the image sensor is configured to perform, a correlated double sampling measurement scheme based on a first pixel readout and a second pixel readout,
wherein the first pixel readout comprises a readout of a pixel at a predetermined amount of time after the pixel was reset, and
wherein the second pixel readout comprises a readout of a pixel directly after the pixel has been reset.

3. The image sensor of claim 1, wherein the readout circuitry comprises a plurality of first segments, wherein each first segment corresponds to a plurality of column lines and is integrated on a respective first semiconductor die,
wherein the image sensor further comprises a plurality of first flex foils configured to connect the thin-film transistor ('TFT') panel to an external device, and
wherein the respective first semiconductor dies are arranged on respective first flex foils.

4. The image sensor of claim 1, wherein the image sensor further comprises:
for each pixel, a source follower configured to buffer a pixel signal and a select transistor configured to output the buffered pixel signal onto the corresponding column line in dependence of a row select signal outputted by the row controller; and
for each column line, a source follower load integrated on the thin-film transistor ('TFT') panel,
wherein the image sensor further comprises, for each pixel:
a photodiode arranged between a signal node and a node that is kept at a first reference voltage;
a storage capacitor configured to accumulate charge due to a photocurrent generated by the photodiode; and a reset transistor coupled between the photodiode and a second reference voltage and configured to set a voltage on the signal node to the second reference voltage in dependence of a reset signal outputted by the row controller.

5. The image sensor of claim 1, wherein the row controller comprises a plurality of second segments, wherein each second segment corresponds to a plurality of rows of the pixel array and comprises a driver for outputting, for said plurality of rows, said row select signals and said reset signals, and wherein each second segment is integrated on a respective second semiconductor die,
wherein the image sensor further comprises a plurality of second flex foils configured to connect the thin-film transistor ('TFT') panel to a remainder of the row controller, wherein the respective second semiconductor dies are arranged on respective second flex foils; and/or
wherein the thin-film transistor ('TFT') panel is based on amorphous silicon, low-temperature polycrystalline silicon, or indium gallium zinc oxide; and/or
wherein the image sensor further comprises a scintillator layer arranged above the pixel array.

6. The image sensor of claim 1, wherein the readout circuitry and/or the row controller is based on complementary metal-oxide-semiconductor ('CMOS') technology.

7. The image sensor of claim 1, wherein the readout circuitry comprises a plurality of analog-to-digital converters ('ADCs').

8. The image sensor of claim 7, wherein the readout circuitry is configured to read out the column lines based on a charge mode readout.

9. The image sensor of claim 8, wherein each readout unit is configured to set a voltage on the respective input node equal to a third reference voltage during the first pixel readout and the second pixel readout, and wherein each readout unit is configured to determine, for each pixel, an output voltage based on a charge transfer during the second pixel readout to or from the capacitive unit; and
wherein each readout unit comprises a charge amplifier comprising an operational amplifier, comprising a non-inverting input connected to the third reference voltage, and an inverting input connected to the capacitive unit via a first switch, wherein an output of the operational amplifier is coupled to the inverting input via a feedback capacitor, and the readout unit further comprises a second switch arranged between the output and the inverting input of the operation amplifier.

10. The image sensor of claim 9, wherein the image sensor comprises a second controller configured to:
control the first and second switches such that the voltage at the input node is set to the third reference voltage when the first and second switches are closed during the first pixel readout, and wherein—the second switch is opened during the second pixel readout; and
open the first switch when an output of the operational amplifier is converted by the plurality of analog-to-digital converters ('ADCs').

11. The image sensor of claim 7, wherein the readout circuitry is configured to read out the column lines based on a voltage mode readout.

12. The image sensor of claim 11, wherein the input node comprises a high impedance input node and wherein each readout unit is configured to set a voltage on the input node equal to a fourth reference voltage during the first readout and to determine an output voltage based on a change in voltage of the input node with respect to the fourth reference voltage during the second pixel readout; and wherein each readout unit further comprises a voltage setting unit configured to set a voltage on the input node to the fourth reference voltage during the first pixel readout, and configured to provide a high impedance state in the second mode thereby allowing the voltage on the input node to track the pixel voltage when changing from a value corresponding to the first pixel readout to a value corresponding to the second pixel readout.

13. The image sensor of claim 12, wherein each readout unit further comprises:

a first operational amplifier comprising a non-inverting input connected via a third switch to the fourth reference voltage and an inverting input connected to an output of the first operational amplifier;

a charge amplifier comprising:
 a second operational amplifier comprising a non-inverting input connected to a fifth reference voltage and an inverting input that is connected via a series capacitor and series fourth switch to the output of the first operational amplifier, and connected via a parallel connection of a feedback capacitor and fifth switch to an output of the second operational amplifier; and a third controller configured to:
 close the third switch during the first pixel readout and to open the third switch during the second pixel readout;
 close the fourth switch during the first and second pixel readouts and to open the fourth switch after the second pixel readout to allow an output of the second operational amplifier to be converted by the plurality of analog-to-digital converters ('ADCs'); and
 open the fifth switch during the first pixel readout and to close the fifth switch during the second pixel readout.

14. An imaging system comprising:
an image sensor comprising:
 a pixel array comprising a plurality of active pixels arranged in a matrix of rows and columns, and comprising a plurality of column lines to which outputs of pixels in the same column are coupled and configured to receive pixel output signals; and
 readout circuitry comprising a plurality of readout units, wherein each readout unit is configured to read out a respective column line through an input node of the readout unit; and
 a row controller for selecting pixels among the plurality of active pixels for read-out,
 wherein the image sensor further comprises a plurality of capacitive units, wherein each capacitive unit is configured to capacitively couple each input node to a respective column line,
 wherein the pixel array and the plurality of capacitive units are integrated on a thin-film transistor ('TFT') panel, and
 wherein the readout circuitry and the row controller are integrated on one or more semiconductor (CMOS) dies; and
a processing unit configured to construct an image based on outputs from the readout circuitry,
wherein the imaging system is configured to construct a plurality of X-ray images of an object, and wherein the imaging system further comprising an X-ray source positioned such that an object to be imaged can be arranged between the X-ray source and the image sensor.

* * * * *